US008098974B2

(12) United States Patent
Lin

(10) Patent No.: US 8,098,974 B2
(45) Date of Patent: Jan. 17, 2012

(54) METHOD AND SYSTEM OF FORMAT CONVERTING AND RECORDING FOR OPTICAL STORAGE MEDIA

(75) Inventor: Jim Lin, Taipei (TW)

(73) Assignee: Via Technologies, Inc., Taipei (TW)

( * ) Notice: Subject to any disclaimer, the term of this patent is extended or adjusted under 35 U.S.C. 154(b) by 1225 days.

(21) Appl. No.: 10/944,744

(22) Filed: Sep. 21, 2004

(65) Prior Publication Data

US 2006/0034588 A1    Feb. 16, 2006

(30) Foreign Application Priority Data

Aug. 11, 2004    (TW) ................................ 93124110 A

(51) Int. Cl.
*H04N 5/765* (2006.01)
*H04N 5/92* (2006.01)
(52) U.S. Cl. ........................................ 386/232; 386/326
(58) Field of Classification Search .................... 386/95, 386/111–112, 125–129, 1, 46, 121, 52–55, 386/66, 83, 108–109, 131
See application file for complete search history.

(56) References Cited

U.S. PATENT DOCUMENTS

| 6,353,702 B1* | 3/2002 | Ando et al. .................... 386/125 |
| 6,438,315 B1* | 8/2002 | Suzuki et al. .................... 386/95 |
| 6,973,221 B1* | 12/2005 | Xue .............................. 382/268 |
| 7,433,294 B2* | 10/2008 | Lee ............................. 369/275.1 |
| 2003/0206729 A1* | 11/2003 | Loui et al. ...................... 386/125 |

FOREIGN PATENT DOCUMENTS

| CN | 1251682 | 4/2000 |
| JP | 2002025182 A | 1/2002 |
| WO | 99/28911 | 6/1999 |

* cited by examiner

*Primary Examiner* — William C Vaughn, Jr.
*Assistant Examiner* — Gelek W Topgyal
(74) *Attorney, Agent, or Firm* — Stout, Uxa, Buyan & Mullins, LLP

(57) ABSTRACT

A format converting and recording method and system for optical storage media including the steps of converting several first optical storage medium information files into the second optical storage medium through generating corresponding navigation tables which gather at a management file, transmitting image of the first optical storage medium to the second optical storage medium, and then generating a destination disc according to the management file. Thus, the operation process is simplified and the problem of lacking in playback control is solved.

8 Claims, 6 Drawing Sheets

| Directory name | File name | Requirement of 2.0 version format |
|---|---|---|
| root ─ VCD | INFO.VCD | required |
| | ENTRIES.VCD | required |
| | LOT.VCD | optional |
| | PSD.VCD | optional |
| ├ MPEGAV | AVSEQ01.DAT | optional |
| | ⋮ | ⋮ |
| | AVSEQ06.DAT | optional |
| ├ CDDA | AUDIO08.DAT | optional |
| | AUDIO09.DAT | optional |
| ├ SEGMENT | ITEM0001.DAT | optional |
| | ITEM0002.DAT | optional |
| | ITEM0010.DAT | optional |
| | ⋮ | ⋮ |
| | ITEM1901.DAT | optional |
| | ITEM1980.DAT | optional |
| ├ CDI | | required |

FIG.1A(Prior Art)

| Directory name | File name |
|---|---|
| root ─ DVD_RTAV | VR_MANGR.IFO |
| | VR_MOVIE.VRO |
| | VR_STILL.VRO |
| | VR_AUDIO.VRO |
| | VR_MANGR.BUP |
| | ⋮ |
| ├ Other directo-ries | Other files |

FIG.1B(Prior Art)

| Directory name | File name |
|---|---|
| root —VIDEO_TS— | —VIDEO_TS.IFO |
| | —VIDEO_TS.VOB |
| | —VIDEO_TS.BUP |
| | ⋮ |
| | Other files |
| Other directo-ries | |

METHOD AND SYSTEM OF FORMAT CONVERTING AND RECORDING FOR OPTICAL STORAGE MEDIA

RELATED APPLICATIONS

The present application is based on, and claims priority from, Taiwanese Application Serial Number 093124110, filed Aug. 11, 2004, the disclosure of which is hereby incorporated by reference herein in its entirety.

BACKGROUND OF THE INVENTION

1. Field of the Invention

The present invention generally relates to a method and system of format converting and recording, and more particularly to a method and system of format converting and recording for optical storage media.

2. Description of the Prior Art

The multimedia and various sound/video compressions have evolved rapidly in recent years as a result of the developments and trend in digital information, thus there are more and more applications between different formats and the reuse of the digital information. And specifically, the applications of the storage media (for instance, VCD and DVD) also have been expanding. In general, the recordable capacity and recording time of a VCD that uses an MPEG I technique is respectively 650 Megabyte (Mbyte) and 74 mins; and the VCD is applicable to save the content of such as karaoke player, PC interactive software or games. The recordable capacity and recording time of a DVD that uses an MPEG II technique is respectively 4.7 Gigabyte and 135 mins; and the DVD is further applicable to save the content of such as movies, high-quality audio files and PC.

Figures 1C, 2A:
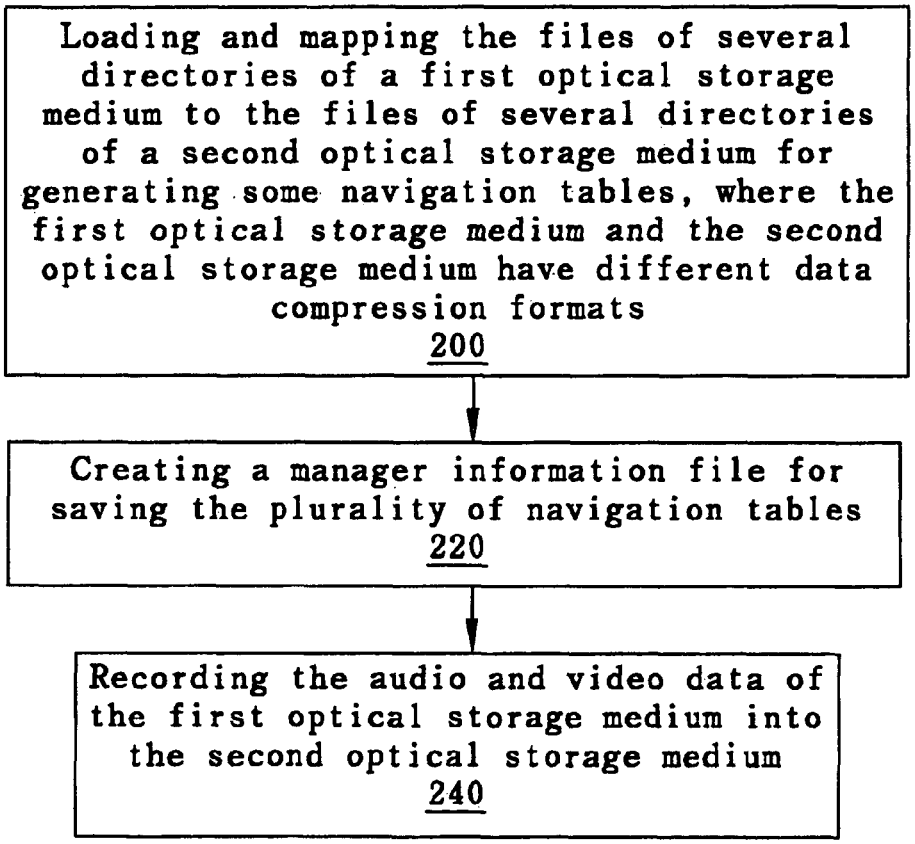

With respect to the file format, a PC with a CD-ROM drive has the VCD and DVD directories shown in FIG. 1A, FIG. 1B and FIG. 1C. FIG. 1A schematically shows the diagram of conventional VCD directories, where the subdirectory VCD of the root directory includes INFO.VCD and ENTRIES.VCD, and subdirectory CDI (when used in red-book 1.1 and 2.0 version) are mandatory for a VCD, while others are optional. Specifically, the file INFO.VCD includes a navigation table, configured to record the main constitutive information of a VCD (for instance, a system identification for verifying a VCD, an edtion of the VCD format, a lookup table of tracks, and disc status flag). The file ENTRIES.VCD is configured to record the entry point table of the VCD tracks in response to the control requirement when playing (for instance, 2.0 version). The file PSD.VCD is configured to record the play procedure and information of the selection list and play list for sequentially reproducing the animations, still frames and audio files in accordance with the play sequence descriptor (i.e. PSD). The CDI subdirectory is configured to record the application programs that are required when reproducing in a CD-I (interactive-media) player. Besides, the subdirectory MPEGAV includes some animations and video files called AVSEQ.DAT; the subdirectory CDDA includes some audio files called AUDIO.DAT; the subdirectory SEGMENT includes various segment reproducing files called ITEM.DAT; and the subdirectory KARAOKE includes the title of artists, the country of the karaoke.

FIG. 1B schematically shows the diagram of conventional DVD-RW directories. The subdirectory DVD_RTAV (i.e. real-time audio video) of the root directory includes the files, such as VR_MANGR.IFO, VR_MOVIE.VRO, VR_STILL.VRO and VR_AUDIO.VRO; wherein the file VR_MANGR.IFO (i.e. video recording manager information) includes a navigation table, which is configured to record the DVD management information such as programs, entry points of DVD tracks and play list.

FIG. 1C schematically shows the diagram of conventional DVD+RW directories. The subdirectory VIDEO_TS of the root directory includes the files, such as VIDEO_TS.IFO, VIDEO_TS.VOB, VIDEO_TS.BUP; wherein the file VIDEO_TS.IFO (i.e. video title set information) includes a navigation table for saving various management information of the DVD+RW.

As the requirement of the storage capacity for multimedia increases, however, it is a trend to use DVD as a data storage medium while VCD and DVD both are optical storage media for recording video and audio information. Accordingly, concerning data compatibility, data share and easy manageability, it becomes a trendy and practical method to use video/audio equipments having recording function for VCD/DVD format converting and data recording. Besides, there are some problems in the conventional recording method for disc data. First, in the recording process, since the disc data is sequentially played to a display or a storage device (for instance, hard discs) and then burned, and therefore we cannot add any control information of chapters (for instance, items of a VCD, cells of a DVD), but continuously using a suspend action by users for achieving the requirement of dividing into chapters. The above-mentioned method is not only inconvenient to users, but also fails to use the playback method to monitor the burning results in the recording process. Second, while watching the video without chapters as recorded in conventional way, the users have no benefits of jumping between the chapters.

SUMMARY OF THE INVENTION

The present invention provides a method of format converting and recording for optical storage media, including the steps of loading and mapping the files of several directories of a first optical storage medium to the files of several directories of a second optical storage medium for generating some navigation tables, wherein the first optical storage medium and the second optical storage medium have different data compression formats. Next, creating a manager information file in the second optical storage medium for saving the navigation tables. And then, recording the audio and video data of the first optical storage medium into the second optical storage medium.

The present invention also provides a correspondence method of format converting and recording, including the steps of reading files of a disc that use an MPEG I technique and respectively generating some navigation tables corresponding with the files of a disc that uses an MPEG II technique; wherein the quantity of the navigation tables corresponds with the quantity of the files of the disc that use the MPEG I technique. Next, saving the navigation tables within a manager information file for providing a data converting means with the process of format converting and recording.

The present invention further provides a disc playing and recording system, configured for generating a destination disc, including an automatic converting and recording component, configured to provide the users of the disc playing and recording system with enabling an operation of format converting and recording of the disc and then generating a signal of converting and recording; and a format converting and recording module, configured to convert and record files of several directories of a first source disc to a manager information file of the destination disc in accordance with the signal of converting and recording, and thus generating the destination disc.

Accordingly, the operation process of converting and recording is simplified and the problem of lacking playback control is solved by using the method and system of format converting and recording between VCD and DVD according to the embodiments of the present invention. Further, it can give consideration to the trend that using DVD as a storage medium for users, and satisfying with data compatibility, data share and easy manageability.

BRIEF DESCRIPTION OF THE DRWAING

Figure 2B:
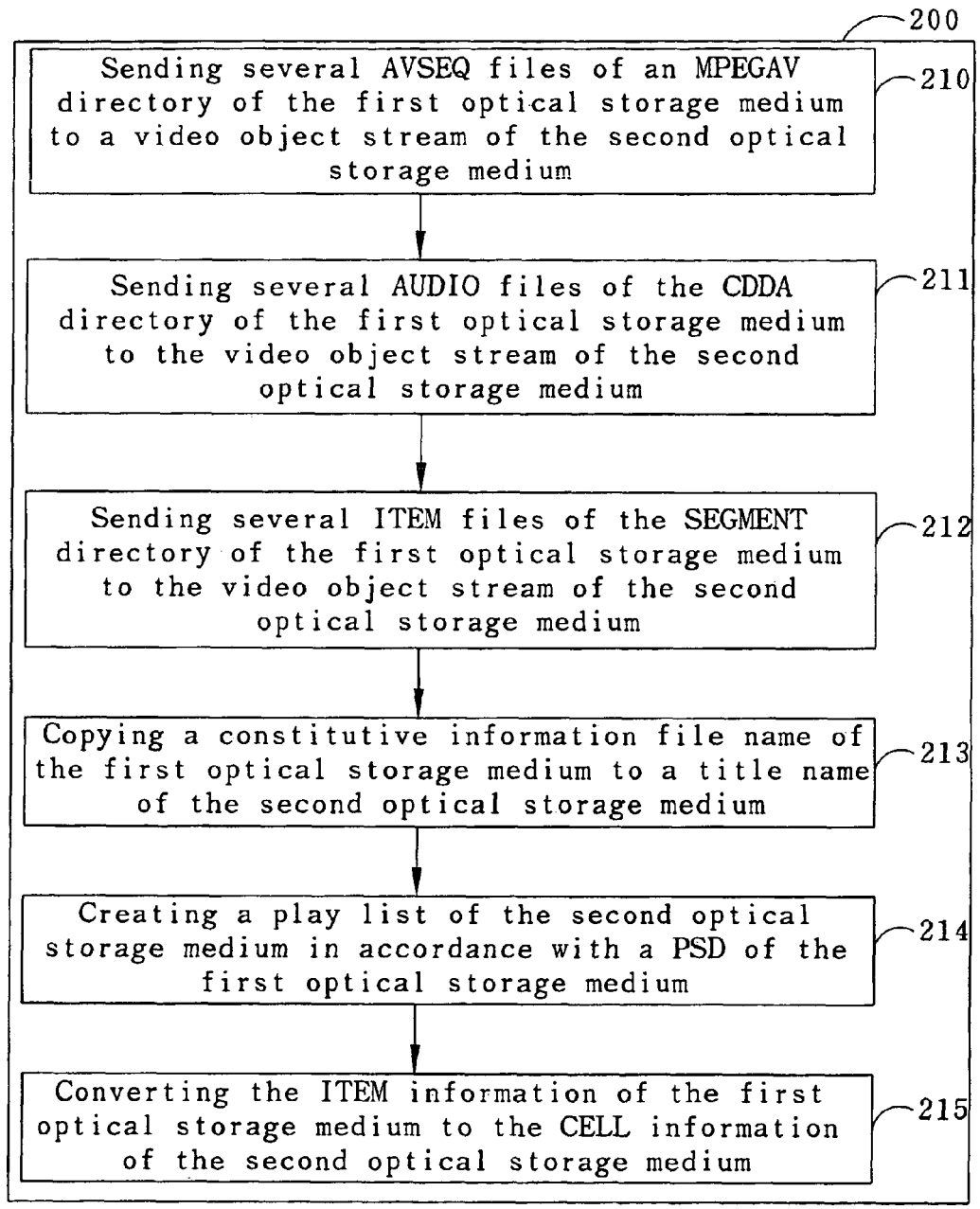
Figure 3A:
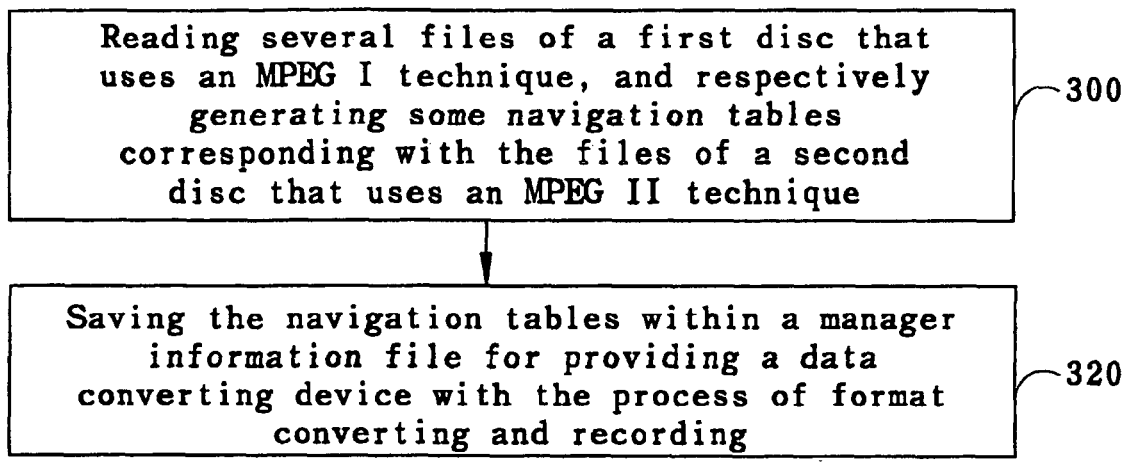
Figure 3B:
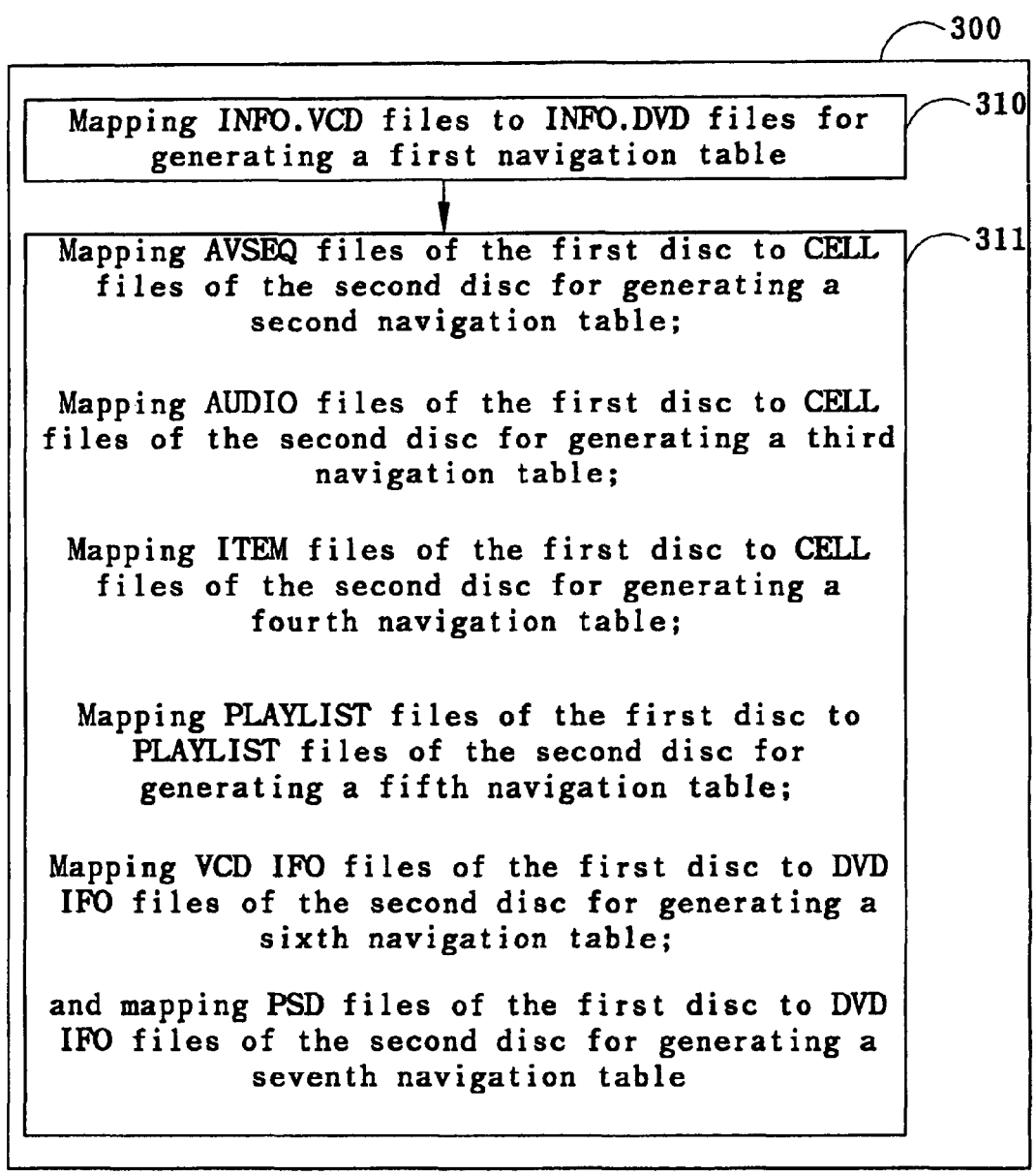
Figure 4:
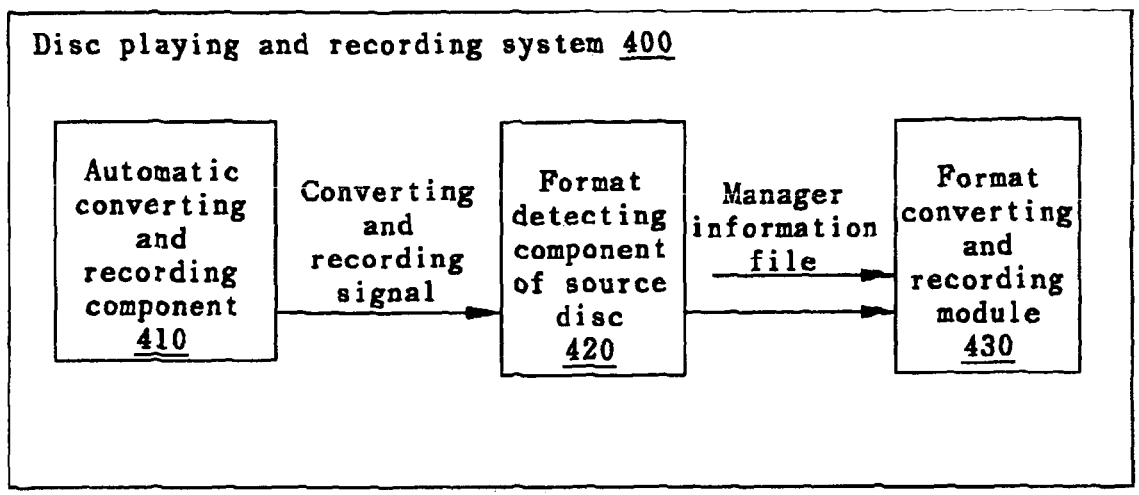

The present invention can be best understood through the following description and accompanying drawings, wherein:

FIG. 1A schematically shows the diagram of conventional VCD directories;

FIG. 1B schematically shows the diagram of conventional DVD-RW directories;

FIG. 1C schematically shows the diagram of conventional DVD+RW directories;

FIG. 2A and FIG. 2B schematically show the diagrams of format converting and recording for optical storage media according to an embodiment of the present invention;

FIG. 3A and FIG. 3B schematically show the diagrams of a correspondence method of format converting and recording according to another embodiment of the present invention;

FIG. 4 schematically shows the diagram of a disc playing and recording system according to one embodiment of the present invention.

DESCRIPTION OF THE PREFERRED EMBODIMENT

Some appropriate and preferred embodiments of the present invention will now be described in the following. It should be noted, however, that the embodiment is merely an example and can be variously modified without departing from the range of the present invention.

It is to be understood, however, that the drawings, which are not to scale, are designed for the purpose of illustration and not as a definition of the limits of the invention, for which reference should be made to the appended claims.

FIG. 2A and FIG. 2B schematically show the diagrams of format converting and recording for optical storage media according to an embodiment of the present invention. Step 200 is loading and mapping the files of several directories of a first optical storage medium (for instance, VCD) to the files of several directories of a second optical storage medium (for instance, DVD) for generating some navigation tables, where the first optical storage medium and the second optical storage medium have different data compression formats (for instance, MPEG I and MPEG II). In addition, step 200 further includes step 210, which is sending several AVSEQ files of an MPEGAV directory of the first optical storage medium to a video object stream of the second optical storage medium. Furthermore, if the first optical storage medium has a CDDA directory, then sends several AUDIO files of the CDDA directory of the first optical storage medium to the video object stream of the second optical storage medium (shown in step 211). If the first optical storage medium has an ITEM directory, then sends several ITEM files of the SEGMENT directory of the first optical storage medium to the video object stream of the second optical storage medium (shown in step 212). Besides, step 200 further includes step 213, which is copying a constitutive information file name of the first optical storage medium to a title name of the second optical storage medium; and step 214, which is creating a play list of the second optical storage medium in accordance with a play sequence descriptor (PSD) of the first optical storage medium; step 215, which is converting the ITEM information of the first optical storage medium to the CELL information of the second optical storage medium. And next, step 220 is creating a manager information file for saving the navigation tables; and step 240 is recording the audio and video data of the first optical storage medium into the second optical storage medium.

In view of the version of format, it should be appreciated that, while some corresponding files of the directories of the first optical storage medium are optional, thus steps 210-250 can be adjusted according to the version of format, and the sequence of processing can be altered too. On the other hand, when used in the DVD-RW including the VR content format and in the DVD+RW including the DVD_video content format, the storage location and the filename of the manager information file created in step 220 have some corresponding differences. For instance, when used in the DVD-RW including the VR content format, the manager information file VR_MANGR.IFO created in step 220 can be created in the sub-directory DVD_RTAV (under the root directory); when used in the DVD+RW including the DVD_video content format, the manager information file VIDEO_TS.IFO created in step 220 can be created in the sub-directory VIDEO_TS (under the root directory).

FIG. 3A and FIG. 3B schematically show the diagrams of a correspondence method of format converting and recording according to another embodiment of the present invention. Step 300 is reading several files of a first disc that uses an MPEG I technique (for instance, a VCD), and respectively generating some navigation tables corresponding with the files of a second disc that uses an MPEG II technique (for instance, a DVD). And, the quantity of the navigation tables corresponds with the quantity of the files of the first disc that uses an MPEG I technique and the version of format. In addition, step 300 further includes step 310, mapping INFO.VCD files to INFO.DVD files for generating a first navigation table. The step 300 further includes step 311, mapping AVSEQ files of the first disc to CELL files of the second disc for generating a second navigation table; mapping AUDIO files of the first disc to CELL files of the second disc for generating a third navigation table; mapping ITEM files of the first disc to CELL files of the second disc for generating a fourth navigation table; mapping PLAYLIST files of the first disc to PLAYLIST files of the second disc for generating a fifth navigation table; mapping VCD IFO files of the first disc to DVD IFO files of the second disc for generating a sixth navigation table; and mapping PSD files of the first disc to DVD IFO files of the second disc for generating a seventh navigation table. In view of the version of format, it should be appreciated that, the sequence of processing by step 311 is alterable and adjustable; thus it can be modified according to the version of format. Next, step 320 is saving the navigation tables within a manager information file for providing a data converting device with the process of format converting and recording. Furthermore, when used in the DVD-RW including the VR content format and in the DVD+RW including the DVD_video content format, the storage location and the filename of the manager information file created in step 220 have some corresponding differences. For instance, when used in the DVD-RW including the VR content format, the manager information file VR_MANGR.IFO created in step 320 can be created in the sub-directory DVD_RTAV (under the root directory); when used in the DVD+RW including the DVD_video content format, the manager information file VIDEO_TS.IFO created in step 320 can be created in the sub-directory VIDEO_TS (under the root directory).

FIG. 4 schematically shows the diagram of a disc playing and recording system according to one embodiment of the present invention. The disc playing and recording system 400 includes an automatic converting and recording component 410, configured to provide the users of the disc playing and recording system 400 with enabling an operation of format converting and recording of disc and then generating a signal of converting and recording. Moreover, the automatic converting and recording component 410 is located at the operation panel of the disc playing and recording system 400 and can be integrated with other components. The disc playing and recording system 400 further includes a format converting and recording module 430, configured to convert and record several files of some directories of a first source disc to a manager information file of the destination disc in accordance with the signal of converting and recording, and thus generating the destination disc (for instance, a DVD). Besides, the disc playing and recording system 400 includes a format detecting component of source disc 420, configured to generate and send the signal of converting and recording to the format converting and recording module 430 in accordance with the status (i.e. when being operated as in a ON situation) of the automatic converting and recording component 410 and the format detecting results of the first source disc (for instance, a VCD).

While this invention has been described with reference to illustrative embodiments, this description does not intend or construe in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method of format converting and recording for optical storage media, comprising:
    loading and mapping a plurality of files of a plurality of directories of a first optical storage medium to a plurality of files of a plurality of directories of a second optical storage medium for generating a plurality of corresponding navigation tables, wherein said first optical storage medium and said second optical storage medium have different Moving Picture Experts Group (MPEG) data compression formats, wherein a quantity of said plurality of navigation tables corresponds with a quantity of said plurality of files of said first optical storage medium;
    sending a plurality of AVSEQ files of an MPEGAV directory of said first optical storage medium to a video object stream of said second optical storage medium;
    sending a plurality of AUDIO files of a CDDA directory of said first optical storage medium to said video object stream of said second optical storage medium if said first optical storage medium has said CDDA directory;
    sending a plurality of ITEM files of a SEGMENT directory of said first optical storage medium to said video object stream of said second optical storage medium if said first optical storage medium has said ITEM directory;
    creating a management file in said second optical storage medium for saving said plurality of corresponding navigation tables, wherein said management file has different storage location and filename when version of format is included; and
    recording audio and video data of said first optical storage medium into said second optical storage medium.

2. The method according to claim 1, comprising:
    copying a constitutive information file name of said first optical storage medium to a title name of said second optical storage medium.

3. The method according to claim 1, comprising:
    creating a play list of said second optical storage medium in accordance with a play sequence descriptor (PSD) of said first optical storage medium.

4. The method according to claim 1, comprising:
    converting said ITEM information of said first optical storage medium to CELL information of said second optical storage medium.

5. A method of format converting and recording, comprising:
    reading a plurality of files of a first disc that uses an MPEG I technique and respectively generating a plurality of corresponding navigation tables in response to a second disc that uses an MPEG II technique, wherein a quantity of said plurality of navigation tables corresponds with a quantity of said plurality of files of said first disc that uses an MPEG I technique;
    mapping AVSEQ files of said first disc to CELL files of said second disc for generating a second navigation table of said plurality of navigation tables;
    mapping AUDIO files of said first disc CELL files of said second disc for generating a third navigation table of said plurality of navigation tables;
    mapping ITEM files of said first disc to CELL files of said second disc for generating a fourth navigation table of said plurality of navigation tables;
    mapping PLAYLIST files of said first disc to PLAYLIST files of said second disc for generating a fifth navigation table of said plurality of navigation tables;
    mapping VCD IFO files of said first disc to DVD IFO files of said second disc for generating a sixth navigation table of said plurality of navigation tables; and
    mapping PSD files of said first disc to DVD IFO files of said second disc for generating a seventh navigation table of said plurality of navigation tables; and
    saving said plurality of navigation tables within a manager information file for providing a data converting means with the process of format converting and recording.

6. The method according to claim 5, wherein generating said plurality of navigation tables comprising:
    mapping INFO.VCD files of said first disc to INFO.DVD files of said second disc for generating a first navigation table of said plurality of navigation tables.

7. A disc playing and recording system, configured for generating a destination disc, comprising:
    an automatic converting and recording component, configured to provide the users of said disc playing and recording system with enabling an operation of format converting and recording of disc and then generating a signal of converting and recording; and
    a format converting and recording module, configured to convert and record a plurality of files of a plurality of directories of a first source disc to a manager information file of said destination disc having Moving Picture Experts Group (MPEG) compression format different from the first source disc in accordance with said signal of converting and recording, and thus generating said destination disc;
    wherein said manager information file stores a plurality of corresponding navigation tables and said plurality of corresponding navigation tables are generated by loading and mapping said plurality of files of said plurality of directories of said first source disc to a plurality of files of a plurality of directories of said destination disc, wherein a plurality of AUDIO files of said first source disc are mapped to a plurality of CELL files of said destination disc for generating a third navigation table of said plurality of nagivstion tables; a plurality of ITEM files of said first disc are mapped to a plurality of CELL files of said destination disc for generating a fourth navigation table of said plurality of navigation tables; a plurality of PLAYLIST files of said first source disc are mapped to a plurality of PLAYLIST files of said second disc for generating a fifth navigation table of said plurality of navigation tables; a plurality of VCD IFO files of said first source disc are mapped to a plurality of DVD IFO files of said destination disc for generating a sixth navigation table of said plurality of navigation tables; and a plurality of PSD files of said first source disc are mapped to a plurality of DVD IFO files of said destination disc for generating a seventh navigation table of said plurality of navigation tables.

8. The system according to claim 7, comprising:
a format detecting component, configured to generate and send said signal of converting and recording to said format converting and recording module in accordance with the status of said automatic converting and recording component and the format detecting results of said first source disc.

\* \* \* \* \*